United States Patent [19]

Knapp

[11] Patent Number: 4,582,402
[45] Date of Patent: Apr. 15, 1986

[54] COLOR-IMPARTING CONTACT LENSES

[75] Inventor: Julius Z. Knapp, Somerset, N.J.

[73] Assignee: Schering Corporation, Kenilworth, N.J.

[21] Appl. No.: 600,860

[22] Filed: Apr. 16, 1984

[51] Int. Cl.⁴ .............................................. G02C 7/04
[52] U.S. Cl. ..................................................... 351/162
[58] Field of Search ............... 351/160 H, 160 R, 161, 351/162

[56] References Cited

U.S. PATENT DOCUMENTS

| | | | |
|---|---|---|---|
| 211,757 | 7/1968 | Urbach | D57/1 |
| 3,536,386 | 10/1970 | Spivack | 351/160 |
| 3,679,504 | 7/1972 | Wichterle | 156/62 |
| 3,712,718 | 1/1973 | LeGrand et al. | 351/162 X |
| 4,460,523 | 7/1984 | Neefe | 264/1.9 |
| 4,472,327 | 9/1984 | Neefe | 351/162 X |

FOREIGN PATENT DOCUMENTS

| | | | |
|---|---|---|---|
| 710230 | 5/1965 | Canada | 351/162 |
| 815956 | 6/1969 | Canada | |

*Primary Examiner*—John K. Corbin
*Assistant Examiner*—Scott J. Sugarman
*Attorney, Agent, or Firm*—Warrick E. Lee, Jr.

[57] ABSTRACT

A colored contact lens comprising a pupil section and an iris section. A colored, opaque, intermittent pattern is deposited over the entire iris section, but a substantial portion within the interstices of the pattern is left uncolored. The lens is capable of coloring the iris of the wearer, yet permitting visualization of the structure of the iris. A fundamental color change, e.g. from brown to blue, is possible, yet the colored iris has a natural appearance.

6 Claims, 5 Drawing Figures

COLOR-IMPARTING CONTACT LENSES

The present invention relates to a contact lens capable of imparting an apparent color change to a wearer's iris, while at the same time permitting visualization of the natural anatomy of the iris. This combination inexpensively provides a unique, natural appearing cosmetic effect, without severely effecting the ability of the lens to transmit oxygen to the cornea.

Colored lenses currently on the market contain a tint throughout the entire section of the lens that covers the iris. While such lenses are capable of enhancing existing eye color or changing the color of light-colored eyes, they are not capable of causing fundamental color changes, for example, from dark brown to light blue.

Wichterle, in U.S. Pat. No. 3,679,504 discloses a contact lens having an opaque pattern covering the entire iris. While Wichterle's lenses are capable of causing a fundamental color change, the result will be an unnatural appearance unless the opaque pattern is very artistically drawn or reproduced by expensive photographic means. This is so because the natural appearance of the iris is not a simple solid color, but a structure comprising many lines and different colors. Moreover, Wichterle's opaque pattern reduces the amount of oxygen transmitted through the lens to the extent that the entire iris section is covered by the opaque pattern.

The present invention is based on the surprising discovery that a colored intermittent pattern deposited over the entire iris section of the lens, while leaving a substantial portion of the iris section uncolored, provides sufficient coloring to achieve the desired effect, yet allows visualization of the structure of the iris, thereby providing a natural appearance. It is possible to actually cause a fundamental color change (e.g., from dark brown to light blue) while still allowing visualization of the structure of the iris.

SUMMARY OF THE INVENTION

One aspect of the invention comprises a corneal contact lens comprising a transparent pupil section, an iris section surrounding said pupil section, and a colored, opaque intermittent pattern deposited over said entire iris section, that leaves a substantial portion within the interstices of said pattern uncolored, said pattern covering at least 30 percent of the surface of said iris section, thereby providing a lens capable of coloring the iris but permitting visualization of the structure of the iris of a person wearing said lens. The elements of the pattern should be undiscernable to the ordinary viewer.

DETAILED DESCRIPTION OF THE INVENTION

Figure 1:
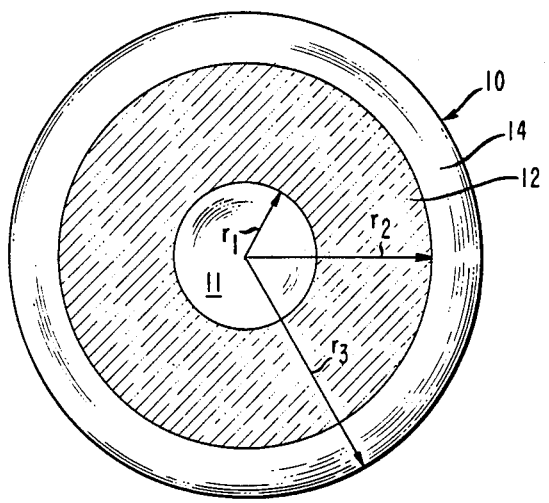
FIG. 1 is a front view of a contact lens in accordance with the invention.

Colored contact lenses in accordance with the invention are shaped like other contact lenses, i.e., they have a concave rear surface adapted to be worn against the cornea and a convex front surface. FIG. 1 is a front view of such a lens. Lens 10 has a transparent pupil section 11 and an iris section 12 surrounding the pupil section. These sections cover corresponding parts of the eye of the wearer. Pupil section 11 and iris section 12 may have radii $r_1$ and $r_2$ of about 2.5 and 4.5 mm. respectively. If the lens is constructed of a hard material, such as polymethyl methacrylate, only the iris and pupil sections are usually present. However, if the lens is made of hydrophilic material, there is usually a transparent peripheral section 14 surrounding the iris section 12 having radius $r_3$, of, for example, about 7.25 mm.

Figure 2:
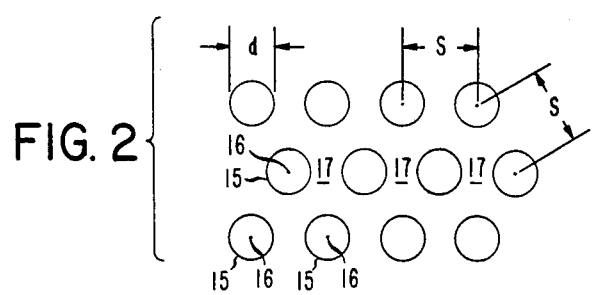
FIG. 2 is an enlarged view of a dot pattern that may be deposited over the iris section of the lens of FIG. 1.

To achieve the desired coloring effect, a colored, opaque, intermittant pattern is deposited over the entire iris section, shown shaded in FIG. 1. However, a substantial portion within the interstices of the pattern is left uncolored. FIG. 2 illustrates a preferred pattern. A series of dots 15 are arranged so that their centers 16 form equilateral triangles. Each dot has a diameter d of 0.1 mm. The spacings s between the centers of the dots is 0.13 mm. The dot size and spacing should be such that at least 30 percent of the surface area of the iris section is covered by the dots, more preferably about 50 percent. The uncovered portion 17 of the iris section, i.e., the portion of the iris section within the interstices of the pattern is left uncolored. The size and spacing of the elements of the pattern (e.g. dots) should be such that the pattern is not visible to the naked eye when viewed from a distance of 5 feet by a person having normal 20—20 vision such person being defined herein as the ordinary viewer. The dots contain enough pigment so that each dot, itself, is opaque.

The invention allows the structure of the iris to be seen, yet the pattern provides enough covering so that the iris of the wearer appears colored.

Figure 3:
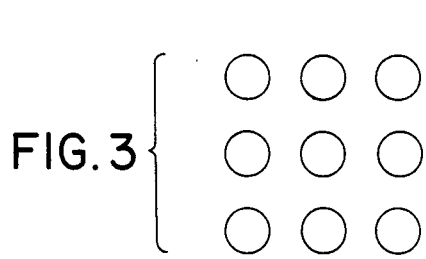
FIGS. 3 and 4 illustrate alternate dot patterns.
Figure 4:
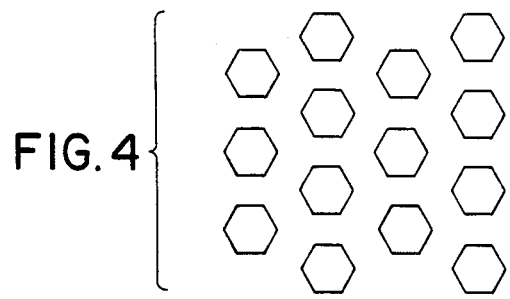
Figure 5:
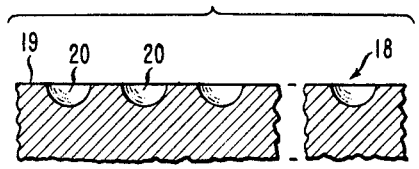
FIG. 5 illustrates a plate that may be used for making lenses in accordance with the invention.

FIGS. 3 and 4 show alternate dot patterns. In FIG. 3 the dots are arranged so that their centers form squares. In FIG. 5 the dots are hexagonally shaped. The exact shape and arrangement of the dots is not critical, provided that there are enough dots to achieve the desired coloring and enough space between the dots so that the structure of the iris is visible.

Lenses in accordance with the invention may be made as follows. A transparent contact lens comprising at least a pupil section 11 and an iris section 12 surrounding the pupil section is provided.

If the lens is constructed of a hydrophilic material, it also has a peripheral section 14 surrounding iris section 12. For hydrophilic material, the steps described below are performed with the material in an unhydrated state. Preferred hydrophilic materials are disclosed by Loshaek in U.S. Pat. No. 4,405,773, incorporated herein by reference.

The colored pattern may be deposited onto iris section 12 of the lens in any manner. The currently preferred method is by offset pad printing, described below in some detail.

A plate 18 as shown in FIG. 5 is prepared having flat surface 19 and circular depressions 20 corresponding to the desired dot pattern. To make the pattern shown in FIG. 2, each depression 20 has a diameter of 0.1 mm. and a depth of 0.013 mm. The depressions are arranged to cover an annular shape corresponding to that of the iris section of the lens.

The plate may be made by a technique that is well known for making integrated analog or digital circuits. First a pattern about 100 times as large as the desired pattern is prepared. Next the pattern is reduced using well known photographic techiques to a pattern of the exact desired size having the dots darker than the undotted area. Flat surface 19 is covered by a photo resist material which becomes water insoluble when exposed to light. The photo resist material is covered with the pattern and exposed to light. The water soluble (dot) portion of the photo resist pattern is removed by washing with water and the resulting plate is etched to the required depth. Then the remainder of the photo resist material is mechanically removed.

Ink containing water-insoluble opaque pigment particles is deposited on flat surface 19 of the plate and scraped across the dot pattern with a doctor blade. This causes depressions 20 to be filled with ink while removing excess ink from flat surface 19.

A pad made of silicon rubber, impregnated with silicone oil for easy release, is pressed against the dot pattern, removing ink from depressions 20. The ink on the pad is allowed to dry slightly to improve tackiness, then pressed against the front surface of the contact lens, depositing the ink in the desired pattern over the iris section. Of course the pad must have enough flexibility to deform to fit over the convex front surface of the lens. For a more natural effect, the printing step may be repeated one or more times using different patterns in different colors, since upon close examination the iris's of many persons are found to contain more than one color. The printed pattern need not be absolutely uniform, allowing for enhancement of the fine structure of the iris.

Next, the deposited pattern is treated to render it resistant to removal from the lens under exposure to the lacrimal fluid (tears) that the lens will encounter when placed in the eye. The exact method of preventing removal depends on the material of construction of the lens and the pattern. For non-hydrophilic lenses containing non-toxic pigments, mere air drying or heating the lens may suffice. For hydrophilic lenses, the techniques for coating the opaque pattern described in Wichterle's U.S. Pat. No. 3,679,504 (incorporated herein by reference) may be used.

It can be seen that the present invention provides lenses capable of coloring the appearance of the wearer's iris, while allowing visualization of the fine structure thereof. The invention has several advantages over prior art techniques:

1. A fundamental color change is possible without excessive interference with the oxygen transmissibility of the lens.

2. A natural appearance is achieved despite fundamental color change, because the structure of the iris is visible.

3. Because the pattern leaves a substantial portion of the iris uncoated, a coating over the pattern adheres better than that of Wichterle's in U.S. Pat. No. 3,679,504.

What is claimed is:

1. A corneal contact lens comprising a transparent pupil section, an iris section surrounding said pupil section, and a colored, opaque, intermittent pattern deposited on a surface over said entire iris section, that leaves a substantial portion within the interstices of said pattern uncolored, said pattern covering at least 30 percent of the surface of said iris section, the elements of the pattern being undiscernable to the ordinary viewer, thereby providing a lens capable of coloring the iris but permitting visualization of the structure of the iris of a person wearing said lens.

2. The lens of claim 1 constructed of a hydrophylic material and further comprising a transparent peripheral section surrounding said iris section.

3. The lens of claim 2 wherein said pattern is a series of opaque dots.

4. The lens of claim 1 wherein said pattern is a series of opaque dots.

5. The lens of claim 1 wherein the elements of the pattern are of more than one color.

6. The lens of claim 1 wherein the pattern is not uniform, thereby allowing enhancement of the fine structure of the iris.

* * * * *